US011570685B2

(12) United States Patent
Gattu et al.

(10) Patent No.: US 11,570,685 B2
(45) Date of Patent: Jan. 31, 2023

(54) POWER SAVINGS FOR WIRELESS SENSORS

(71) Applicant: Carrier Corporation, Palm Beach Gardens, FL (US)

(72) Inventors: Ramakrishna Gattu, Telangana (IN); Ravi Kumar Kandhi, Telangana (IN); Amarnath Reddy Jambuluri, Telangana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 510 days.

(21) Appl. No.: 16/659,053

(22) Filed: Oct. 21, 2019

(65) Prior Publication Data
US 2020/0137658 A1 Apr. 30, 2020

(30) Foreign Application Priority Data

Oct. 24, 2018 (IN) ............................. 201811040104

(51) Int. Cl.
H04W 40/10 (2009.01)
G06F 1/32 (2019.01)
H04W 84/18 (2009.01)

(52) U.S. Cl.
CPC ............ H04W 40/10 (2013.01); G06F 1/32 (2013.01); H04W 84/18 (2013.01)

(58) Field of Classification Search
CPC ........ F24F 11/30; F24F 11/56; F24F 2110/10; G05D 23/1931; G06F 1/32; H04W 84/18
See application file for complete search history.

(56) References Cited

U.S. PATENT DOCUMENTS

| 5,552,763 | A | 9/1996 | Kirby |
| 5,963,253 | A | 10/1999 | Dwyer |
| 6,513,723 | B1 * | 2/2003 | Mueller ................. F23N 5/022 236/51 |
| 6,894,600 | B2 | 5/2005 | Phelan |

(Continued)

FOREIGN PATENT DOCUMENTS

| CN | 101893865 B | 12/2013 |
| CN | 102395183 B | 8/2014 |
| CN | 102984791 B | 1/2016 |

OTHER PUBLICATIONS

Chauhan, Anamika, et al. "TADEEC: Threshold Sensitive Advanced Distributed Energy Efficient Clustering Routing Protocol for Wireless Sensor Networks", International Journal of Computer Applications (0975-8887), Jun. 2014, vol. 96, No. 23, 6 Pages.

(Continued)

Primary Examiner — Brian T Misiura
(74) Attorney, Agent, or Firm — Cantor Colburn LLP

(57) ABSTRACT

A sensing system includes a wireless sensor configured to detect a current sensed value of an environmental condition, the wireless sensor programmed with a delta threshold; a thermostat in communication with the wireless sensor; wherein, when the current sensed value differs from a prior transmitted sensed value by more than the delta threshold, the wireless sensor transmits the current sensed value to the thermostat; wherein, when the current sensed value differs from the prior transmitted sensed value by less than the delta threshold, the wireless sensor stores the current sensed value as a stored sensed value.

14 Claims, 3 Drawing Sheets

(56) References Cited

U.S. PATENT DOCUMENTS

| | | | |
|---|---|---|---|
| 7,024,218 B2 | 4/2006 | Bender | |
| 7,058,477 B1* | 6/2006 | Rosen | F24F 11/30 |
| | | | 236/1 C |
| 7,081,693 B2 | 7/2006 | Hamel et al. | |
| 7,102,505 B2 | 9/2006 | Kates | |
| 7,109,875 B2 | 9/2006 | Ota et al. | |
| 7,354,005 B2* | 4/2008 | Carey | F24F 11/74 |
| | | | 700/277 |
| 7,537,171 B2* | 5/2009 | Mueller | F23N 5/203 |
| | | | 455/343.4 |
| 8,035,516 B2 | 10/2011 | Edwards et al. | |
| 8,503,943 B2 | 8/2013 | Spanhake | |
| 8,719,327 B2 | 5/2014 | Blevins et al. | |
| 8,873,444 B2 | 10/2014 | Tiberi et al. | |
| 9,077,183 B2 | 7/2015 | Thomas et al. | |
| 9,213,342 B2* | 12/2015 | Drake | G05D 23/1931 |
| 9,222,906 B2 | 12/2015 | Youssi et al. | |
| 9,568,977 B2 | 2/2017 | Ding et al. | |
| 9,696,052 B2* | 7/2017 | Malchiondo | F24F 11/74 |
| 9,794,730 B2 | 10/2017 | Wark et al. | |
| 9,947,209 B2 | 4/2018 | Mu et al. | |
| 10,684,037 B2* | 6/2020 | Kaliyaperumal | F24F 11/32 |
| 10,739,028 B2* | 8/2020 | Salsbury | G08C 17/02 |
| 2010/0060434 A1 | 3/2010 | Shiotsu et al. | |
| 2012/0191415 A1 | 7/2012 | Naito et al. | |
| 2016/0284386 A1 | 9/2016 | Mccall et al. | |
| 2018/0132183 A1* | 5/2018 | Gattu | H04W 52/0203 |
| 2019/0277704 A1* | 9/2019 | Burger | G01K 1/026 |

OTHER PUBLICATIONS

Dağtaş, S. et al. "Real-Time and Secure Wireless Health Monitoring", International Journal of Telemedicine and Applications, Published online May 11, 2008, Retrieved Sep. 24, 2018 from https://www.ncbi.nlm.nih.gov/pmc/articles/PMC2386148/, 21 Pages.

Gadai, Seema Rani, et al. "Comparison and Analysis between Distinguish Clustering Protocols of Wireless Sensor Networks (A Survey)", International Journal of Computer Applications (0975 - 8887), Jul. 2016, vol. 145, No. 8, 6 Pages.

Lee, Changsoo, et al. "Ubiquitous Sensor Networks and Image Processing Based Environmental Monitoring System for Fire System", International Journal of Distributed Sensor Networks, First Published: May 26, 2014, Retrieved on Sep. 24, 2018 from http://journals.sagepub.com/doi/full/10.1155/2014/349207, 23 Pages.

PrivateEyePi, "WIFI Temperature & Humidity Sensor Internet Of Things (IOT)", available at: https://ha.privateeyepi.com/store/index.php?route=product/product&product_id=127, accessed Oct. 21, 2019, 2 pages.

Tharini, C., et al., "An Energy Efficient Spatial Correlation Based Data Gathering Algorithm for Wireless Sensor Networks", International Journal of Distributed and Parallel Systems, May 2011, vol. 2, No. 3, 9 Pages.

* cited by examiner

POWER SAVINGS FOR WIRELESS SENSORS

FOREIGN PRIORITY

This application claims priority to Indian Patent Application No. 201811040104, filed Oct. 24, 2018, and all the benefits accruing therefrom under 35 U.S.C. § 119, the contents of which in its entirety are herein incorporated by reference.

BACKGROUND

The embodiments described herein relate generally to sensing systems including wireless sensors, and more particularly to power savings for wireless sensors in a sensing system.

Wireless sensors may be used to sense environmental parameters, such as temperature and humidity, and report the sensor data to a sync node or master over an RF protocol. The wireless sensors are typically battery operated and power conservation is an important factor. Of all the components in the wireless sensor, typically RF communication takes more power as compared to sampling and processing of data.

SUMMARY

According to an embodiment, a sensing system includes a wireless sensor configured to detect a current sensed value of an environmental condition, the wireless sensor programmed with a delta threshold; a thermostat in communication with the wireless sensor; wherein, when the current sensed value differs from a prior transmitted sensed value by more than the delta threshold, the wireless sensor transmits the current sensed value to the thermostat; wherein, when the current sensed value differs from the prior transmitted sensed value by less than the delta threshold, the wireless sensor stores the current sensed value as a stored sensed value.

In addition to one or more of the features described herein, or as an alternative, further embodiments of the system may include wherein, when one or more stored sensed values exceeds a limit, the wireless sensor transmits at least one stored sensed value to the thermostat.

In addition to one or more of the features described herein, or as an alternative, further embodiments of the system may include wherein the limit is one of a number of stored sensed values, a size of the stored sensed values or a time since a last transmission from the wireless sensor to the thermostat.

In addition to one or more of the features described herein, or as an alternative, further embodiments of the system may include wherein the thermostat adjusts the delta threshold in the wireless sensor.

In addition to one or more of the features described herein, or as an alternative, further embodiments of the system may include wherein the thermostat adjusts the delta threshold in the wireless sensor in response to an operating mode of the thermostat.

In addition to one or more of the features described herein, or as an alternative, further embodiments of the system may include wherein the thermostat adjusts the delta threshold in the wireless sensor in response to battery life of a battery in the wireless sensor.

In addition to one or more of the features described herein, or as an alternative, further embodiments of the system may include wherein the thermostat adjusts the delta threshold in the wireless sensor in response to a user input.

In addition to one or more of the features described herein, or as an alternative, further embodiments of the system may include wherein the delta threshold in the wireless sensor is adjusted by a remote computing system.

According to another embodiment, a method includes detecting, at a wireless sensor, a current sensed value of an environmental condition, the wireless sensor programmed with a delta threshold; when the current sensed value differs from a prior transmitted sensed value by more than the delta threshold, transmitting the current sensed value; wherein, when the current sensed value differs from the prior transmitted sensed value by less than the delta threshold, storing the current sensed value as a stored sensed value at the wireless sensor.

In addition to one or more of the features described herein, or as an alternative, further embodiments of the method may include wherein, when one or more stored sensed values exceeds a limit, transmitting at least one stored sensed value.

In addition to one or more of the features described herein, or as an alternative, further embodiments of the method may include wherein the limit is one of a number of stored sensed values, a size of the stored sensed values or a time since a last transmission from the wireless sensor.

In addition to one or more of the features described herein, or as an alternative, further embodiments of the method may include adjusting the delta threshold.

In addition to one or more of the features described herein, or as an alternative, further embodiments of the method may include wherein adjusting the delta threshold occurs in response to battery life of a battery in the wireless sensor.

In addition to one or more of the features described herein, or as an alternative, further embodiments of the method may include wherein adjusting the delta threshold occurs in response to a user input.

In addition to one or more of the features described herein, or as an alternative, further embodiments of the method may include adjusting the delta threshold in the wireless sensor by a remote computing system.

According to another embodiment, a computer program product, tangibly embodied on a computer readable medium, the computer program product including instructions that, when executed by a processor, cause the processor to perform operations including: detecting, at a wireless sensor, a current sensed value of an environmental condition, the wireless sensor programmed with a delta threshold; when the current sensed value differs from a prior transmitted sensed value by more than the delta threshold, transmitting the current sensed value; wherein, when the current sensed value differs from the prior transmitted sensed value by less than the delta threshold, storing the current sensed value as a stored sensed value at the wireless sensor.

Technical effects of embodiments of the present disclosure include the saving of power by a wireless sensor by transmitting sensor data when a current sensed value is different than a prior transmitted value by a delta threshold.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
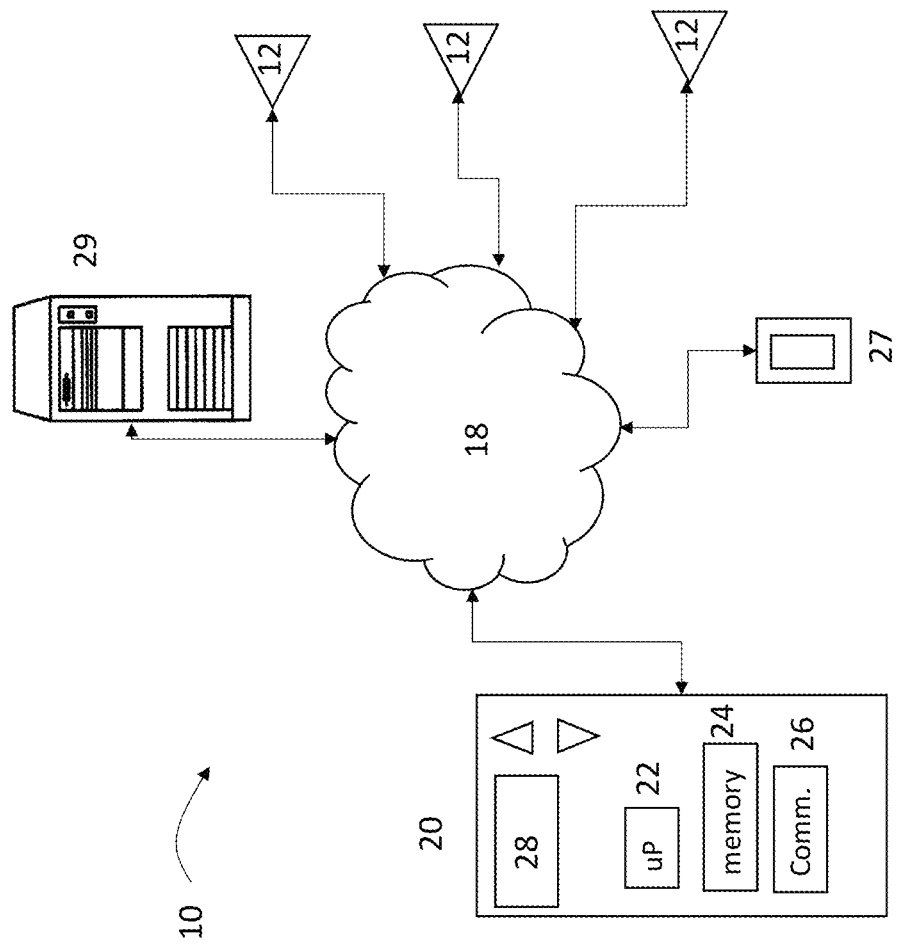
FIG. 1 depicts a sensing system in an example embodiment.

FIG. 1 is depicts a sensing system 10 in an example embodiment. The sensing system 10 includes a plurality of wireless sensors 12 that detect environmental conditions, such as temperature and/or humidity. The wireless sensors 12 may be in communication with a thermostat 20. The wireless sensors 12 communicate with the thermostat 20 over a wirelesses network 18. The thermostat 20 sends controls signals to an HVAC system (not shown) to control environmental conditions in areas monitored by the wireless sensors 12. A remote device 27 (e.g., a phone, tablet, digital assistant, watch, wearable, etc.) may interface with the sensing system 10 over the network 18. A remote computing system 29, such as a server or distributed computing network (e.g., cloud computing) may interface with the wireless sensors 12 and/or the thermostat 20 via network 18, as described herein.

The thermostat 20 may include a processor 22, memory 24 and communication module 26 as shown in FIG. 1. The processor 22 can be any type or combination of computer processors, such as a microprocessor, microcontroller, digital signal processor, application specific integrated circuit, programmable logic device, and/or field programmable gate array. The memory 24 is an example of a non-transitory computer readable storage medium tangibly embodied in the thermostat 20 including executable instructions stored therein, for instance, as firmware. The communication module 26 may implement one or more communication protocols as described in further detail herein. The thermostat 20 may also include a user interface 28 to provide for programming delta thresholds for each wireless sensor 12, as described in further detail herein.

Figure 2:
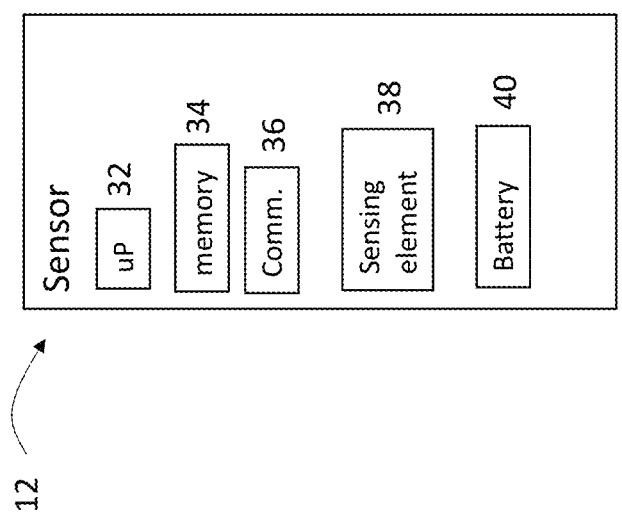
FIG. 2 depicts a wireless sensor in an example embodiment.

FIG. 2 depicts a wireless sensor 12 in an example embodiment. The wireless sensor 12 may include a processor 32, memory 34 and communication module 36 as shown in FIG. 2. The processor 32 can be any type or combination of computer processors, such as a microprocessor, microcontroller, digital signal processor, application specific integrated circuit, programmable logic device, and/or field programmable gate array. The memory 34 is an example of a non-transitory computer readable storage medium tangibly embodied in the wireless sensor 12 including executable instructions stored therein, for instance, as firmware. The communication module 36 may implement one or more communication protocols as described in further detail herein. A sensing element 38 senses an environmental condition (e.g., temperature, humidity, etc.) in an area adjacent the wireless sensor 12. A battery 40 powers the components of the wireless sensor 12.

As noted above, the thermostat 20 communicates with the wireless sensors 12 over the wireless network 18. Communication between the thermostat 20 and the wireless sensors 12 may be performed using known wireless protocols (e.g., 802.xx, Zigbee, BTLE, PAN, etc.). The wireless communication protocols are implemented by the communication module 26 in the thermostat 20 and the communication module 36 in the wireless sensor 12. Network 18 also supports communication with the remote computing system 29 using wireless and/or wired protocols (LAN, WAN, cellular, GSM, etc.)

Figure 3:
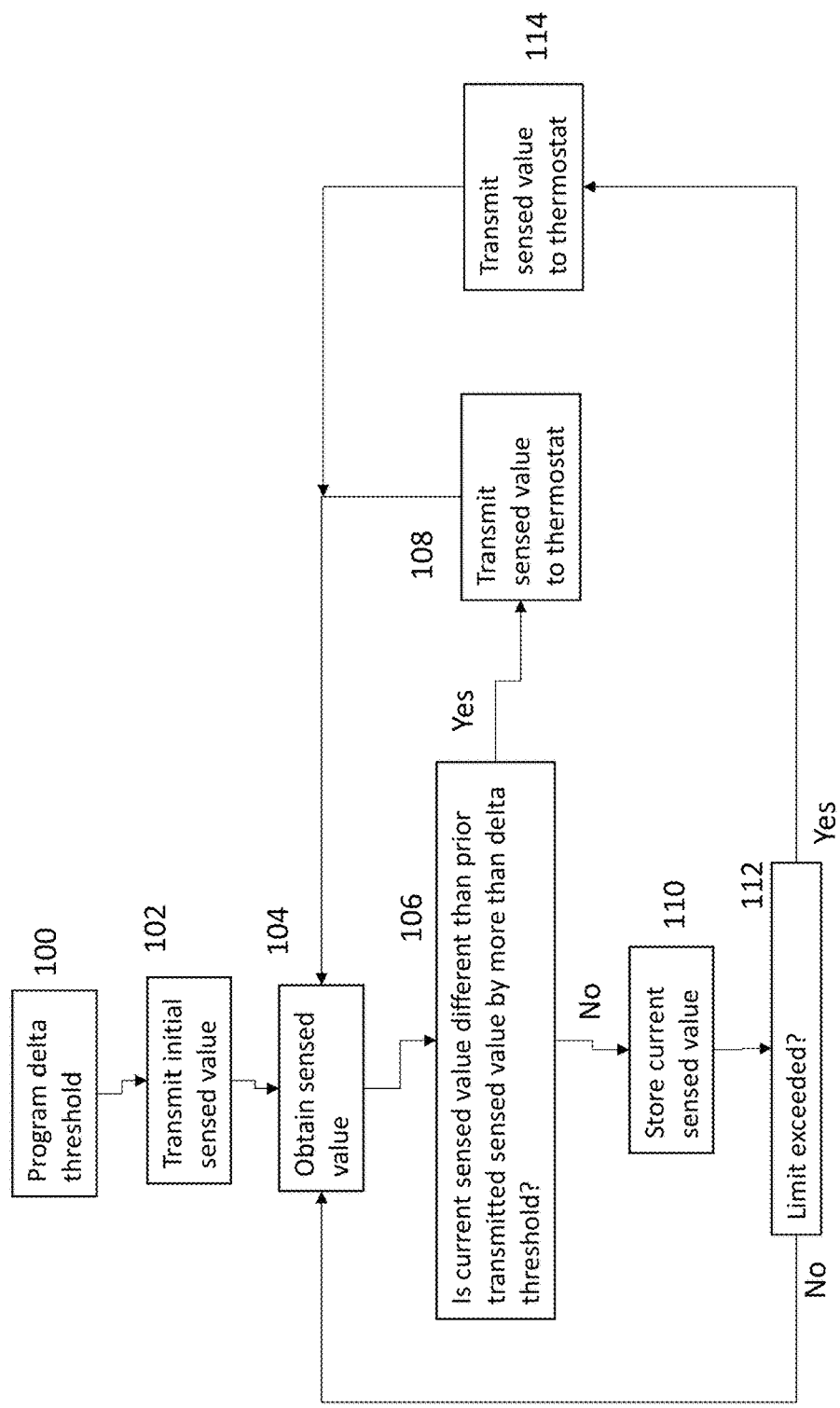
FIG. 3 depicts process executed by the sensing system in an example embodiment.

FIG. 3 depicts process executed by the sensing system 10 in an example embodiment. FIG. 3 is described with reference to a single wireless sensor, but it is understood that the operations will be performed for each wireless sensor 12. At 100, a delta threshold is programmed to the wireless sensor 12. Each wireless sensor 12 may be programmed with a different delta threshold. For example, a sun room may be programmed with a large delta threshold as temperature variations are acceptable, whereas a master bedroom may be programmed with a small delta threshold. The delta thresholds may vary depending on the sensed condition. For example, the delta threshold for temperature may be different than the delta threshold for humidity. The delta threshold may be stored in memory 34 of the wireless sensor 12.

At 102, the wireless sensor 12 transmits an initial sensed value to the thermostat 20. This entails powering on the communications module 36, sending the sensed value to the thermostat over network 18 and powering off the communications module 36 to conserve power.

At 104, the wireless sensor 12 obtains a current sensed value from the sensing element 38. This may occur periodically (e.g., every 30 seconds).

At 106, the processor 32 of the wireless sensor 12 determines if the current sensed value is different than the prior transmitted sensed value by more than the delta threshold. The prior transmitted sensed value corresponds to the most recent sensed value transmitted from the wireless sensor 12 to the thermostat 20. If so, flow proceeds to 108 where the wireless sensor 12 transmits the current sensed value, which then serves as the next, prior transmitted value. At 108, the wireless sensor 12 may also transmit the battery level of the battery 40 to the thermostat 20. Transmitting the current sensed value includes powering on the communications module 36, sending the current sensed value to the thermostat 20 and then powering off the communication module 36. The decision made at 106 may be represented as follows: if |current temp−transmitted temp|>delta-threshold-temperature; OR if |current humidity−transmitted humidity|>delta-threshold-humidity; then transmit current sensed value and make prior transmitted value=current sensed value.

If at 106, the processor 32 of the wireless sensor 12 determines that the current sensed value is not different than the prior transmitted sensed value by more than the delta threshold, flow proceeds to 110 where the current sensed value is stored in memory 34.

At 112, the processor 32 of the wireless sensor 12 determines if a limit has been exceeded. The limit may be represented as a number of stored, sensed values without a transmission to the thermostat 20. The limit may also be represented as a size limit (e.g., 1 megabyte of stored sensed values). The limit may also be represented as a time limit (e.g., 4 hours have passed since last transmission). If the limit is exceeded, then flow proceeds to 114 where the wireless sensor 12 sends at least one stored, sensed value from the memory 34 to the thermostat 20. If the limit relates to the number or size of the stored, sensed values, the wireless sensor 12 may transmit all the stored, sensed values from memory 34 to the thermostat 20. If the limit relates to a time period without transmission, the wireless sensor 12 may transmit one stored, sensed value from the memory 34 to the thermostat 20, to indicate that the wireless sensor 12 is still operating normally. At 114, the wireless sensor may also include the current battery level of battery 40. Transmitting the at least one stored, sensed value includes powering on the communications module 36, sending the at least one stored, sensed value to the thermostat 20 and powering off the communication module 36.

The delta thresholds programmed at each wireless sensor 12 may be updated in real time by the thermostat 20. The thermostat 20 may adjust the delta threshold at one or more wireless sensors 12 in response to an operating mode of the thermostat. For example, if the thermostat 20 is in AWAY mode (e.g., no occupants) the delta thresholds may be increased to conserve battery life of the wireless sensors 12. The thermostat 20 may adjust the delta threshold at one or more wireless sensors 12 in response to the battery level of the battery 40. For example, if the battery level for a battery 40 in a wireless sensor 12 is low, then the thermostat 20 may adjust the delta threshold to increase the delta threshold, which will conserve battery life. The delta threshold may be set to zero, so that every sensed value is transmitted from the wireless sensor 12 to the thermostat 20.

The configuration parameters of the wireless sensors 12 may be adjusted remotely. For example, the delta thresholds, sampling intervals, etc. of one or more wireless sensors 12 may be adjusted by a user, either through the user interface 28 of the thermostat 20 or through the remote device 27 over the network 18. A user input may be sent to increase or decrease the delta threshold stored in one or more wireless sensors 12. The configuration parameters of the wireless sensors 12 may also be adjusted via the remote computing system 29 over network 18 without user interaction with the thermostat 20 or mobile device 27.

As described above, embodiments can be in the form of processor-implemented processes and devices for practicing those processes, such as a processor in the wireless sensor 12 or a processor in the thermostat 20. Embodiments can also be in the form of a computer program product containing instructions embodied in tangible computer readable media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sensing system comprising:
a wireless sensor configured to detect a current sensed value of an environmental condition, the wireless sensor programmed with a delta threshold;
a thermostat in communication with the wireless sensor;
wherein, when the current sensed value differs from a prior transmitted sensed value by more than the delta threshold, the wireless sensor transmits the current sensed value to the thermostat;
wherein, when the current sensed value differs from the prior transmitted sensed value by less than the delta threshold, the wireless sensor stores the current sensed value as a stored sensed value;
wherein the thermostat adjusts the delta threshold in the wireless sensor.

2. The sensing system of claim 1, wherein, when one or more stored sensed values exceeds a limit, the wireless sensor transmits at least one stored sensed value to the thermostat.

3. The sensing system of claim 2, wherein the limit is one of a number of stored sensed values, a size of the stored sensed values or a time since a last transmission from the wireless sensor to the thermostat.

4. The sensing system of claim 1, wherein the thermostat adjusts the delta threshold in the wireless sensor in response to an operating mode of the thermostat.

5. The sensing system of claim 1, wherein the thermostat adjusts the delta threshold in the wireless sensor in response to battery life of a battery in the wireless sensor.

6. The sensing system of claim 1, wherein the thermostat adjusts the delta threshold in the wireless sensor in response to a user input.

7. The sensing system of claim 1, wherein the delta threshold in the wireless sensor is adjusted by a remote computing system.

8. A method comprising:
detecting, at a wireless sensor, a current sensed value of an environmental condition, the wireless sensor programmed with a delta threshold;
when the current sensed value differs from a prior transmitted sensed value by more than the delta threshold, transmitting the current sensed value;
wherein, when the current sensed value differs from the prior transmitted sensed value by less than the delta threshold, storing the current sensed value as a stored sensed value at the wireless sensor;
adjusting the delta threshold.

9. The method of claim 8, wherein, when one or more stored sensed values exceeds a limit, transmitting at least one stored sensed value.

10. The method of claim 8, wherein the limit is one of a number of stored sensed values, a size of the stored sensed values or a time since a last transmission from the wireless sensor.

11. The sensing system of claim 8, wherein adjusting the delta threshold occurs in response to battery life of a battery in the wireless sensor.

12. The method of claim 8, wherein adjusting the delta threshold occurs in response to a user input.

13. The method of claim 8, further comprising adjusting the delta threshold in the wireless sensor by a remote computing system.

14. A computer program product, tangibly embodied on a computer readable medium, the computer program product including instructions that, when executed by a processor, cause the processor to perform operations comprising:
   detecting, at a wireless sensor, a current sensed value of an environmental condition, the wireless sensor programmed with a delta threshold;
   when the current sensed value differs from a prior transmitted sensed value by more than the delta threshold, transmitting the current sensed value;
   wherein, when the current sensed value differs from the prior transmitted sensed value by less than the delta threshold, storing the current sensed value as a stored sensed value at the wireless sensor;
   adjusting the delta threshold.

\* \* \* \* \*